US011794729B2

(12) United States Patent
Javaid

(10) Patent No.: US 11,794,729 B2
(45) Date of Patent: Oct. 24, 2023

(54) VEHICLE DECELERATION PLANNING

(71) Applicants: Hyundai Motor Company, Seoul (KR); Kia Motors Corporation, Seoul (KR)

(72) Inventor: Bilal Javaid, Ada, MI (US)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 302 days.

(21) Appl. No.: 17/206,343

(22) Filed: Mar. 19, 2021

(65) Prior Publication Data
US 2022/0297682 A1 Sep. 22, 2022

(51) Int. Cl.
B60W 30/09 (2012.01)
(52) U.S. Cl.
CPC ......... B60W 30/09 (2013.01); B60W 2520/10 (2013.01); B60W 2554/20 (2020.02); B60W 2554/4041 (2020.02); B60W 2554/60 (2020.02); B60W 2554/802 (2020.02); B60W 2720/106 (2013.01)
(58) Field of Classification Search
CPC .. B60W 30/09; B60W 30/095; B60W 30/143; B60W 30/18109; B60W 60/0011; B60W 60/0015; B60W 2510/18; B60W 2520/10; B60W 2554/20; B60W 2554/4041; B60W 2554/4049; B60W 2554/60; B60W 2554/802; B60W 2556/20; B60W 2556/25; B60W 2720/106
See application file for complete search history.

(56) References Cited

U.S. PATENT DOCUMENTS

| 8,589,060 | B2 | | 11/2013 | Becker | |
|---|---|---|---|---|---|
| 9,587,952 | B1 | * | 3/2017 | Slusar | ................... G01C 21/362 |
| 9,701,307 | B1 | | 7/2017 | Newman et al. | |
| 2018/0037227 | A1 | * | 2/2018 | D'sa | ..................... B60W 30/16 |
| 2021/0114625 | A1 | * | 4/2021 | Liu | ..................... B60W 60/0015 |
| 2021/0309254 | A1 | * | 10/2021 | Murahashi | ......... B60W 60/0011 |
| 2022/0297682 | A1 | * | 9/2022 | Javaid | ................... B60W 30/09 |

FOREIGN PATENT DOCUMENTS

| KR | 20180071776 A | * | 6/2018 | ............ B60W 30/08 |
|---|---|---|---|---|
| KR | 10-1989095 B1 | | 6/2019 | |
| KR | 10-2029638 B1 | | 10/2019 | |

* cited by examiner

Primary Examiner — Peter D Nolan
Assistant Examiner — Ce Li Li
(74) Attorney, Agent, or Firm — Fox Rothschild LLP

(57) ABSTRACT

Methods and systems address a situation in which an autonomous vehicle encounters an object while driving. A system may include determining a vehicle trajectory of a subject vehicle passing over the object detected in front of the subject vehicle, and in response to determining the vehicle trajectory, generating a vehicle deceleration plan for approaching the object and traveling over the object. The system may include executing the vehicle deceleration plan as the subject vehicle travels over the object, where the vehicle deceleration plan is based on a preceding vehicle located behind the subject vehicle and a reaction time of the preceding vehicle as it reacts to deceleration of the subject vehicle.

17 Claims, 7 Drawing Sheets

| Factor# | Factor | Description | Justification |
|---|---|---|---|
| 1 | 1/TTC_worst | The inverse of worst-case time-to-collision expected between ego and following vehicle, given some speed profile | Smaller TTC means higher risk of collision |
| 2 | 1/tgap_worst | The inverse of worst-case time-gap expected between ego and following vehicle, given some speed profile | Smaller time-gap means higher risk of collision |
| 3 | $v_f * risk_{obj}$ | The risk of damage or harm by driving through the object at a particular speed. $v_f$ is the expected vehicle speed when encountering the object, and $risk_{obj}$ is the risk of the object itself, taken from the behavior-level planning calculation. | Higher speed when encountering object means more risk of damage or harm |
| 4 | discomfort | Occupant discomfort, given some speed profile | Avoid discomforting the occupant if there is nearly no risk of obstacle or following vehicle |

FIG. 4

| Initial conditions: | |
|---|---|
| Parameter | Value |
| Distance to following vehicle | 10 m |
| Distance to object | 90 m |
| Ego vehicle speed | 35 m/s |
| Following vehicle speed | 35 m/s |
| Object risk value | 100 |

VEHICLE DECELERATION PLANNING

TECHNICAL FIELD

The present disclosure relates generally to vehicles, and more particularly, to vehicle deceleration planning for autonomous vehicles.

BACKGROUND

Autonomous vehicles may suddenly encounter objects while driving. For example, an object (e.g., a plastic bag, tire tread, Styrofoam) may suddenly appear when a leading vehicle swerves around the object. Some autonomous vehicle planning algorithms may be designed to avoid objects on the road by swerving or coming to a complete stop. But in other cases, driving over or through the object is safer than swerving or stopping to avoid rear-end collisions with a preceding vehicle.

Driving over the object presents safety challenges and driving over the object at an excessive speed may cause damage to the vehicle. Conversely, driving over the object too slowly following a sudden deceleration may cause a rear-end collision with a preceding vehicle. Currently developed vehicle planning algorithms avoid objects on the road by swerving or coming to a complete stop, which increases a risk of rear-end collision by a preceding vehicle.

SUMMARY

The present disclosure provides a system and method for generating a declaration plan for an autonomous vehicle.

In one aspect, there is provided a system including at least one processor and at least one memory. The at least one memory may store instructions. When executed by the at least one data processor, the instructions may cause the at least one data processor to at least: determine a vehicle trajectory in which the vehicle passes over an object detected in front of a vehicle. In response to determining the vehicle trajectory, a vehicle deceleration plan is generated for approaching the object and traveling over the object.

According to an exemplary embodiment, the object is detected based on data received from a vehicle sensor and the vehicle deceleration plan is based on a distance between the vehicle and the object. The determination that the vehicle trajectory includes the vehicle passing over the objection is based on determining that passing over the object is a least dangerous trajectory for the vehicle. The vehicle deceleration plan includes a first rate of deceleration of the vehicle and a second rate of deceleration of the vehicle. The second rate of deceleration decelerating at a higher rate than the first rate of deceleration. Additionally, the second rate of deceleration is subsequent in time to the first rate of deceleration.

According to another exemplary embodiment, the vehicle deceleration plan is based on a preceding vehicle located within a predetermined distance to the subject vehicle. The vehicle deceleration plan is based on a preceding vehicle reaction time representative of time necessary for the preceding vehicle to react to the subject vehicle decelerating. Additionally, the vehicle deceleration plan balances a rear-end collision risk of the preceding vehicle with the subject vehicle and a risk of traveling over the object at a speed greater than a predetermined speed.

Further, the vehicle deceleration plan is based on predicting a minimum time necessary for a rear-end collision of the preceding vehicle with the subject vehicle. The minimum time necessary for the rear-end collision is based on a preceding vehicle distance, a preceding vehicle speed, and a preceding vehicle deceleration.

According to another exemplary embodiment, the operations further include determining an object width is less than an inner distance from a left tire to a right tire of the subject vehicle in response to determining that the vehicle trajectory includes passing over the object. Additionally, the method includes determining an object height is less than a vehicle ground clearance. The vehicle deceleration plan for approaching the object and traveling over the object is adjusted in response to determining that the object width is less than the inner distance and the object height is less than the vehicle ground clearance. In response to adjusting the vehicle deceleration plan, the method includes whether the object is remains in front of the vehicle. When the object remains, the vehicle deceleration plan is further adjusted.

Further, according to an exemplary embodiment, the vehicle deceleration plan is based on a risk of damage to the vehicle by driving over the object at a predetermined speed. The risk of damage is determined by calculating a danger that the object poses to the subject vehicle and the predetermined speed is calculated based on a subject vehicle speed, a vehicle deceleration, a preceding vehicle reaction time representative of time necessary for a preceding vehicle to react to the subject vehicle deceleration. Additionally, the vehicle deceleration plan may be based on a maximum deceleration of the vehicle and a jerk indicative of a rate of change of deceleration.

Implementations of the current subject matter may include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer-implemented methods consistent with one or more implementations of the current subject matter can be implemented by one or more data processors residing in a single computing system or multiple computing systems.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The exemplary embodiments herein may be better understood by referring to the following description in conjunction with the accompanying drawings in which like reference numerals indicate identically or functionally similar elements, of which:

FIG. 4 depicts a table illustrating an example of factors that are evaluated to calculate the optimal vehicle deceleration plan;

DETAILED DESCRIPTION

Figure 1:
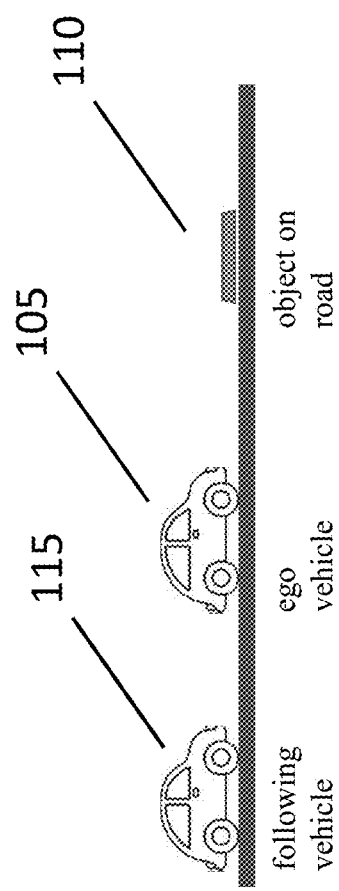
FIG. 1 depicts a diagram of an example of a vehicle on a road approaching an object on the road with a preceding vehicle behind the vehicle.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about." The vehicle may generate a vehicle deceleration plan that balances the risk of collision with an object and the risk of a rear-end collision. The vehicle deceleration plan minimizes the risk of a rear-end collision while minimizing the risk of damage by colliding with the object. The risk of rear-end collision can be minimized by generating a vehicle deceleration plan that factors a reaction time of a preceding vehicle.

According to an exemplary embodiment of the present disclosure, the vehicle deceleration plan may be used in situations where the least dangerous trajectory is passing over the object or colliding with the object. Unlike previous solutions, the vehicle deceleration plan may consider multiple factors for reducing the vehicle speed when passing over an object is imminent. Previous solutions do not address scenarios in which an object on road may be passed over safely. Furthermore, the solution of the present disclosure balances the risk of rear-end collision and the risk of driving through the object once the vehicle determines that swerving around the object presents a higher risk than passing over the object.

In response to determining that it is necessary to pass over the object, the vehicle generates a vehicle deceleration plan. The vehicle deceleration plan may balance the risk of a rear-end collision and the risk of driving over the object too fast (at an excessive speed). For example, the vehicle may decelerate less rapidly in response to detecting the object and then decelerate more rapidly once the preceding vehicle has sufficient time to react to the vehicle decelerating. This timed deceleration approach provides the preceding vehicle with sufficient time to react to avoid a rear-end collision. Additionally, this timed deceleration approach enables the vehicle to significantly reduce a speed thereof as the vehicle travels over the object. This balancing minimizes the overall risk of damage to the vehicle. The vehicle deceleration plan may calculate specific times at which to change the rate of deceleration and speed of the vehicle, especially as the vehicle monitors the preceding vehicle distance and the approaching object distance. Where other solutions may determine an evasive trajectory to avoid the object, the present embodiments generate and calculate a vehicle deceleration plan to minimize risks of damage.

The methods, systems, apparatuses, and non-transitory storage mediums described herein calculate the optimal rates of deceleration to minimize risk of collision and damage to the vehicle when stopping is necessary. The various exemplary embodiments also contemplate generating a vehicle deceleration plan when the vehicle is required to slow or stop, such as in cases of a road gradient, a traffic sign, a traffic light, a construction zone, a change in a speed limit, an obstacle in a road, a tire losing traction, a road curvature, an applied brake of the vehicle, or a cutoff of fuel to an engine.

FIG. 1 depicts a diagram of an example of a vehicle on a road approaching an object on the road with a preceding vehicle behind the vehicle (e.g., subject vehicle). As used herein, the term "preceding vehicle" refers to a vehicle behind the subject vehicle, e.g., as shown in FIG. 1. The object 110 may suddenly appear within the view of the vehicle 105 when a preceding vehicle 115 (labeled in FIG. 1 as a "following vehicle") swerves around the object 110. Alternately, the object 110 may suddenly appear within the view of the subject vehicle 105 when the object 110 falls from a leading vehicle. The object 110 may suddenly appear when the wind blows the object 110 onto the road. The present disclosure is not limited to such scenario but covers any scenario where the object appears suddenly to the subject vehicle.

The vehicle 105 may be equipped with data sensors configured to detect the surroundings of the vehicle 105. The data sensors on the vehicle may include a LiDAR system, a RADAR system, a camera, a light detector, a motion detector, a proximity sensor, and/or the like. The data sensors may be configured to detect the object 110. The data sensors may be configured to detect the preceding vehicle 115.

The preceding vehicle 115 may be a vehicle in the same lane of traffic as the subject vehicle 105. The preceding vehicle 115 may be an autonomous vehicle or operated by a human. The human in the preceding vehicle may have a reaction time to any indication that the vehicle 105 is decelerating. The maximum reaction time of the human may be assumed (predetermined) to be a certain value such as 0.5, 0.75, 1, 1.25, 1.5, 1.75, 2, 2.25, 2.5, 2.75, or 3 seconds. The vehicle 105 may use the predetermined maximum reaction time in calculating the vehicle deceleration plan.

In some exemplary embodiments, the vehicle 105 may be configured to detect that the preceding vehicle 115 is operated autonomously. The preceding vehicle 115 that is autonomous may have a shorter reaction time to deceleration than a preceding vehicle 115 that is human operated. The preceding vehicle 115 may react nearly immediately after the vehicle 105 brakes. The maximum reaction time of the autonomous vehicle may be assumed (predetermined) to be a certain value such as 0.1, 0.3, 0.5, 0.7, 1, 1.25, or 1.5 seconds. The vehicle 105 may use the predetermined maximum reaction time for an autonomous vehicle in calculating the vehicle deceleration plan. The vehicle 105 may be configured to communicate with the preceding vehicle 115 that the vehicle 105 is decelerating via vehicle-to-vehicle (V2V) communication and/or the like.

Figure 2:
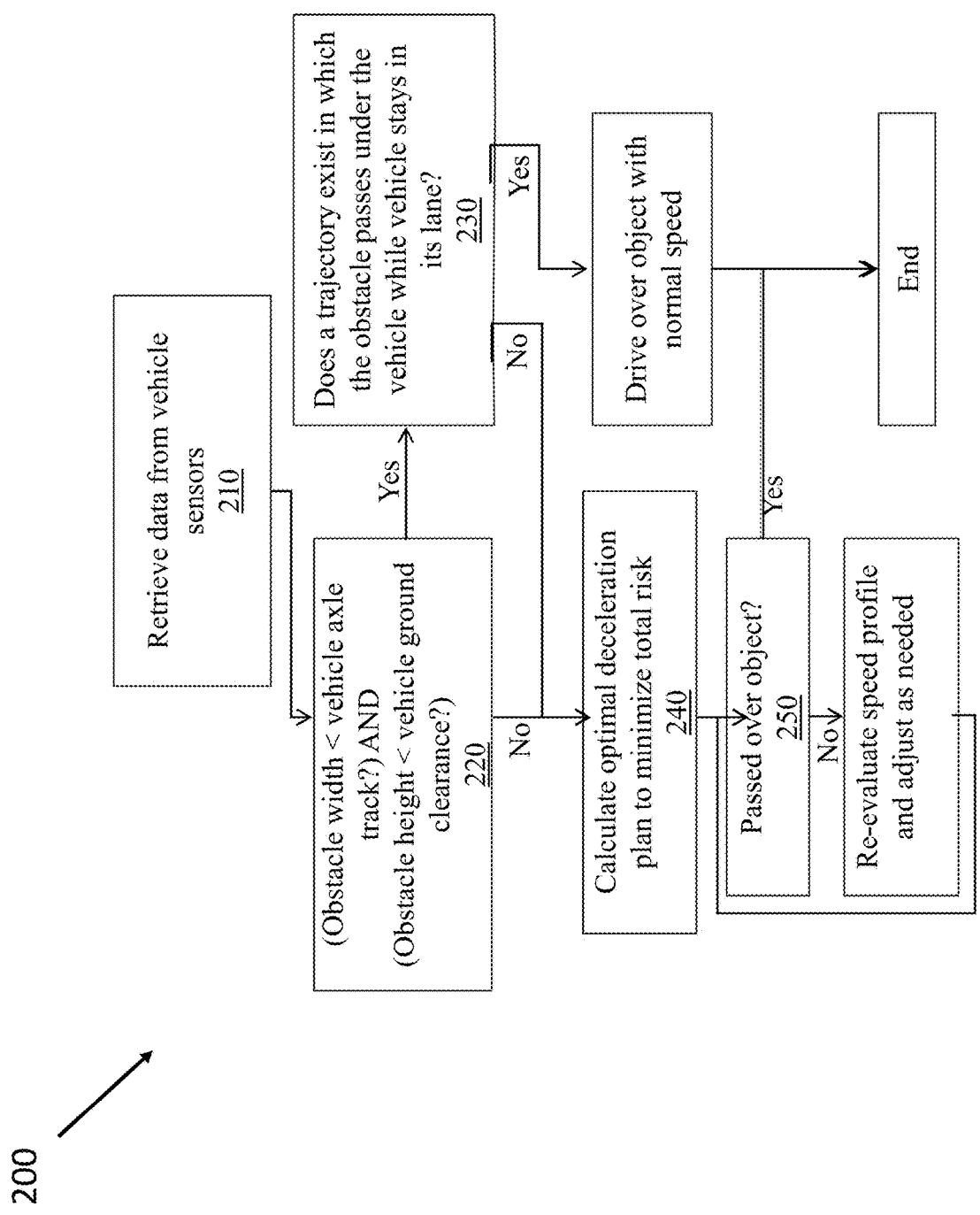
FIG. 2 depicts a flowchart illustrating an example of a process for calculating an optimal vehicle deceleration plan to minimize risk to a vehicle.

FIG. 2 depicts a flowchart illustrating an example of a process for calculating an optimal vehicle deceleration plan to minimize risk to a vehicle. The vehicle deceleration plan flowchart 200 may evaluate an approaching object 110 to determine an optimal speed to pass over the object 110. The vehicle deceleration plan flowchart 100 may be triggered once traveling over the object 110 is determined to be the best course of action. The vehicle deceleration plan flowchart 100 may be selected when coming to a complete stop or serving around the object 110 is an option. The vehicle deceleration plan flowchart 100 may also consider the presence of a preceding vehicle 115 in determining the rate at which the vehicle should decelerate.

At 210, data is collected from vehicle sensors to evaluate the surroundings of the vehicle 105, and more particularly, the object 115 in front of the vehicle 105 and the preceding vehicle 115. Additionally, information may be received instructing that the vehicle 105 is to pass over the object 110. The information may include data used to determine that passing over the object 110 is the least dangerous trajectory. The data may also be collected relating to the preceding vehicle 115. For example, the data may indicate whether the preceding vehicle 115 is autonomous or operated by a human.

The data may provide information related to object 115. For instance, the data may provide information regarding a width, a height, and a composition of the object 110. The composition of the object 110 may include the density and the collapsibility of the object 110. The width, height, and composition of the object 110 may be evaluated to determine a perceived threat of the object 110. The perceived threat of the object 110 may be based on the width, the height, and the composition of the object 110. Some objects may be relatively large but deemed a lower threat based on their composition. For example, Styrofoam, paper bags, and collapsed cardboard boxes present a relatively low threat because there may be easily destroyed by the vehicle 105 or have no impact on the course of the vehicle 105. Some objects may be relatively small but present a higher threat based on their composition. For example, rocks, poles, and scattered wood present a relatively high threat because they cannot be easily broken down by the vehicle 105 or could potentially cause damage to the undercarriage of the vehicle 105.

At 220, the received data and information may be evaluated to determine whether the object 110 may pass underneath the vehicle 105 without contacting the vehicle 105. For example, the width of the object 110 may be compared to the inner distance between the right tire and the left tire (i.e., the vehicle axle track). In another example, the height of the object 110 may be compared to the vehicle ground clearance. If the width of the object 110 is wider than the vehicle axle track or the height of the object 110 is higher than the vehicle ground clearance, then the vehicle 105 may have to make contact with the object 110. If the width of the object 110 is not as wide as the vehicle axle track or the height of the object 110 is not as high as the vehicle ground clearance, then the vehicle 105 may not have to make contact with the object 110.

At 230, whether the vehicle 105 will make contact with the object 115 may be determined. In particular, to determine whether the vehicle will make contact with the object 115, a vehicle trajectory may be calculated that enables the vehicle to avoid contacting the object and remain in its lane. For example, a vehicle trajectory may be mapped out such that the vehicle may maneuver within the lane to avoid hitting a hubcap (or the like). In another example, a vehicle trajectory avoiding contact with the 2×4 lumber may not be calculated unless the vehicle 105 exits the lane. The vehicle 105 may maintain a speed if the vehicle trajectory enables the vehicle 105 to avoid contacting the object 110 and remain in its lane. Otherwise, the vehicle 105 may need to decelerate to mitigate risk to the vehicle 105.

At 240, a vehicle deceleration plan may be generated to minimize total risk to the vehicle 105. The vehicle deceleration plan minimizes the risk of a rear-end collision while minimizing the risk of damage by colliding with the object 110. The vehicle deceleration plan may be used where the least dangerous trajectory is passing over the object 110 or colliding with the object 110. Unlike previous solutions, the vehicle deceleration plan may consider multiple factors for the best way to reduce the vehicle speed when passing over an object 110 is imminent. For example, the vehicle 105 may decelerate more gradually in response to detecting the object 110 and then decelerate more rapidly once the preceding vehicle 115 has sufficient time to react to the vehicle decelerating. This approach provides the preceding vehicle 115 with sufficient time to react to avoid a rear-end collision and changes the speed and deceleration of the vehicle 115 as the vehicle approaches the object 110 and travels over the object, minimizing damage to the vehicle 105. A vehicle deceleration plan may include calculating a specific times at which to change that rate of deceleration and speed of the vehicle 105 as the vehicle monitors the preceding vehicle distance and the approaching object distance.

At 250, whether the vehicle 105 has passed over the object 115 may be determined. The data from the vehicle sensors may provide the necessary information to determine that the object 115 is still in front of the vehicle. For example, a cardboard box may have shifted from an original position when originally detected. The vehicle may be configured to determine the cardboard box is still in front of the vehicle 105 based on the sensor data. The vehicle deceleration plan may be configured to adjust to the new position of the cardboard box to minimize the total risk to the vehicle 105. The vehicle 105 may continuously monitor the object. In another example, the preceding vehicle 115 may have reacted more quickly to the deceleration of the vehicle 105. The vehicle deceleration plan may be configured to adjust to the new speed of the preceding vehicle 115 to minimize the total risk to the vehicle 105. The vehicle 105 may continuously monitor the preceding vehicle 115. The vehicle deceleration plan may continuously update specific times at which to change that rate of deceleration and speed of the vehicle as the vehicle monitors the preceding vehicle distance and the object distance.

Figure 3:
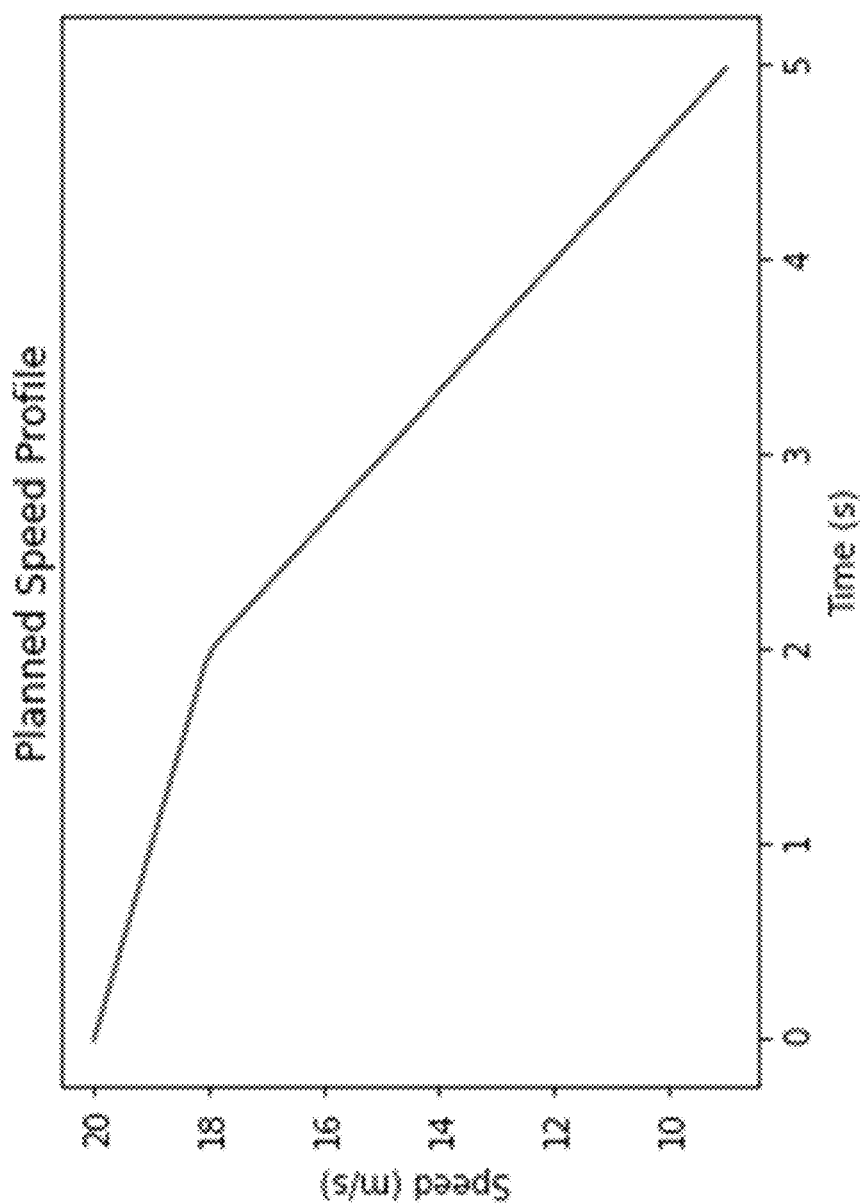
FIG. 3 depicts a figure illustrating an example in which the vehicle deceleration plan may cause the vehicle to decelerate at two different rates over time.

FIG. 3 depicts a figure illustrating an example in which the vehicle deceleration plan may cause the vehicle to decelerate at two different rates over time. The vehicle deceleration plan may balance the risk of a rear-end collision and the risk of driving over the object too fast. For example, the vehicle 105 may continuously decelerate less rapidly in response to detecting the object 110 and then decelerate more rapidly once the preceding vehicle 115 has sufficient time to react to the vehicle decelerating. This timed deceleration approach gives the preceding vehicle 115 time to react to avoid a rear-end collision. Additionally, this timed deceleration approach enables the vehicle 105 to significantly reduce a speed thereof as the vehicle 105 travels over the object 115. This balancing minimizes the overall risk of damage to the vehicle 105. The vehicle deceleration plan may calculate specific times at which to change that rate of deceleration and speed of the vehicle 105, especially as the vehicle monitors the preceding vehicle distance and the approaching object distance.

In some exemplary embodiments, the vehicle deceleration may include an initial slowdown followed by a more severe slowdown. The initial slowdown enables the preceding vehicle 115 to react to the slowdown of the vehicle 105 after a predetermined reaction time. Following the predetermined reaction time, the preceding vehicle 115 may be aware of the slowdown of the vehicle 105 and may be able to brake more aggressively. The vehicle deceleration plan may be expressed by the following equation:

$$v(t)=v_e+a1t+a2(t-t_r)H(t-t_r)$$

wherein $v_e$ is current velocity of the vehicle, t is elapsed time, so at the time of calculation, t=0, $t_r$ is the human reaction time (e.g. 2 seconds), H(t) is the Heaviside step function, and a1 and a2 are the parameters that are to be solved. The parameters a1 and a2 determine the rates of deceleration. A purpose of the vehicle deceleration plan includes determining the combination of a1 and a2 that minimizes the total risk. In particular, a1 may represent the rate of deceleration until the human reaction time and a2 may represent the rate of deceleration after the human reaction time. Additionally, a1 and a2 are constrained by the acceleration limits according the dynamics model of the vehicle 105.

In one example as shown in FIG. 4, the graph simulates example data for a vehicle traveling 20 meters per second and assumes a human reaction time of 2 seconds. In this case, the rates at which the vehicle should decelerate is −1 meter per second squared before the predetermined reaction time and −2 meters per second squared after the predetermined reaction time.

FIG. 4 depicts a table illustrating an example of factors that are evaluated to calculate the optimal vehicle deceleration plan. The deceleration factor table 400 may include various factors that evaluate the total risk of the deceleration. The deceleration factor table 400 may include various factors that are indicative of the level of aggression of the vehicle deceleration plan.

The vehicle deceleration plan may be calculated by tuning vehicle deceleration plan factors to minimize total risk. A total risk function may be a weighted sum of the vehicle deceleration plan factors. For example, the vehicle deceleration plan factors may include a minimum time to collision, a minimum time gap before collision, risk of damage to the vehicle by the object, the maximum deceleration, and the greatest change in acceleration. The total risk function may be a weighted sum expressed by this equation:

$$y=\theta 1x1+\theta 2x2+\theta 3x3+\theta 4x4+\ldots$$

wherein y is the risk cost result, xi is the value of the #i feature, θi is the weight of the #i feature. The total risk function may contain multiple factors. Each of the factors may be calculated in response to detecting an object 110 in the road. Each of the factors may be calculated in response to detecting a preceding vehicle 115 within a predetermined distance. Each of the factors bears an overall risk on the weighted sum. Some factors may be given more weight than other factors. For example, the factor weighing risk of damage to the vehicle may be given more weight than the maximum deceleration factor and the greatest change in acceleration factor. The weight of each factor may change over time and as the vehicle approaches the object 110 and as the preceding vehicle 115 approaches the vehicle 105.

One vehicle deceleration plan factor may be a minimum time-to-collision factor. The minimum time-to-collision factor determines when the preceding vehicle 115 will collide with the vehicle 105 under the expectation that the preceding vehicle 115 does not react to the deceleration of the vehicle 105 until the predetermined reaction time. In other words, the minimum time-to-collision factor presumes that the preceding vehicle will continue at its existing speed while the vehicle is slowing down for the predetermined reaction time. In some exemplary embodiments, the minimum time-to-collision factor may occur at or before the predetermined reaction time. The minimum time-to-collision factor may be calculated as follows:

$$\text{Minimum Time-to-Collision} = \frac{\sqrt{\Delta v^2 - 2\Delta a \Delta x} + \Delta v}{-\Delta a} - t_r$$

wherein Δv=(velocity of vehicle 105)−(velocity of preceding vehicle 115); Δx=(position of vehicle 105)−(position of vehicle 115); Δa=a1 (a parameter from vehicle 105 deceleration plan)−(acceleration of preceding vehicle 115).

In some cases, the minimum time-to-collision factor may be modified. For example, the minimum time-to-collision factor may be set to infinity where a collision will not occur under current conditions if the factor is substantially greater than the predetermined reaction time. This modification has the result of making the factor equivalent to 0 (due to the inverse relationship) and no contribution to the total risk. In another example, the minimum time-to-collision factor may be set to 0 where a collision is certain to occur under current conditions if the factor is less than the predetermined reaction time. This modification has the result of making the factor equivalent to infinity (due to the inverse relationship) and making the total risk infinite.

Another vehicle deceleration plan factor may be a worst-case time gap. The worst-case time gap determines an amount of time the preceding vehicle 115 will collide with the vehicle with respect to the predetermined reaction time of the preceding vehicle 115. In some exemplary embodiments, the worst-case time gap may occur at or before the predetermined reaction time. The worst-case time gap may be calculated as follows:

$$\text{tgap\_worst} = \frac{\Delta x + \Delta v t_r + 0.5 \Delta a t_r^2}{-\Delta v - \Delta a t_r}$$

wherein Δv=(velocity of vehicle 105)−(velocity of preceding vehicle 115); Δx=(position of vehicle 115)−(position of vehicle 115); Δa=a1 (a parameter from vehicle 105 deceleration plan)−(acceleration of preceding vehicle 115).

Another vehicle deceleration plan factor may be a risk factor of damage to vehicle 105 by the object 115. The risk factor of the object itself may determine a risk level of the object itself. For instance, the data may provide information regarding a width, a height, and a composition of the object 110. The composition of the object 110 may include the density and the collapsibility of the object 110. The width, height, and composition of the object 110 may be evaluated to determine a perceived threat of the object 110. The perceived threat of the object 110 may be based on the width, the height, and the composition of the object 110. Some objects may be relatively large but deemed a lower threat based on their composition. For example, Styrofoam, paper bags, and collapsed cardboard boxes present a relatively low threat because there are easily destroyed by the vehicle 105 or have no impact on the course of the vehicle 105. Some objects may be relatively small but present a higher threat based on their composition. For example, rocks, poles, and scattered wood present a relatively high threat because they cannot be easily broken down by the vehicle 105 or could potentially cause damage to the undercarriage of the vehicle 105.

The risk factor of damage to vehicle may also factor the projected speed of the vehicle 105 at the time of impact with the object 115. A speed profile function may be used to determine the speed of the vehicle 105 at the time of impact with the object 115 by solving the equation below for $t_0$, as shown below:

$$xo = x_r + v_r t_o + 0.5 a 2 t_o^2$$

wherein xo is the position of the object 115, and $x_r$ is the expected position of the vehicle 105 at the reaction time $t_r$, which may be evaluated as:

$$xr = x_e + v_e t_r + 0.5 a 1 t_r^2$$

and wherein $v_r$ is the velocity of the vehicle 105 at the reaction time $t_r$, evaluated as:

$$vr = v_e + a 1 t_r$$

Another vehicle deceleration plan factor may be a maximum deceleration and a greatest change in acceleration. Maximum deceleration and the greatest change in acceleration (i.e., jerk) may be combined to represent a discomfort factor. The discomfort factor may correct excessive acceleration and jerk, which is uncomfortable for the occupants of the vehicle 105. The discomfort factor may also discourage unnecessary slowdowns, which may bother the occupants of the vehicle 105. The discomfort factor may carry less weight than the other factors since safety concerns carry more weight than comfort. The discomfort factor may prevent the vehicle from overreacting to a sudden appearance of the object 115. For example, the vehicle may continue driving normally without unnecessarily braking if a plastic bag suspended in the air is detected. In the conventional art, the vehicle 105 would unnecessarily apply maximum braking (e.g., engagement of brake pedal) in response to the plastic bag suspended in the air.

The discomfort factor itself may be calculated as a weighted sum of 2 factors: maximum deceleration and jerk. Maximum deceleration may include the absolute value of the deceleration of the vehicle 105 at various points in time as the vehicle 105 approaches the object 115. Jerk may evaluate the change in acceleration over time. In some exemplary embodiments, the jerk may only use the greatest change in deceleration over time to the vehicle 105 as the vehicle approaches the object 115. The maximum deceleration and jerk may be evaluated by the equation below:

$$\text{discomfort factor} = \theta 1 (a1 + a2) + \theta 2 (a2 - a1) / t_a$$

The first term in the discomfort factor equation may be the maximum deceleration the vehicle occupants experience during the slowdown. The second term in the discomfort factor equation may include jerk, which is the rate of change in deceleration over time as the vehicle 105 approaches the object 115. In some exemplary embodiments, $t_a$ may be the time in which the vehicle will transition its deceleration at the reaction time $t_r$. For example, $t_a$ may be 0.5, 0.75, 1, 1.25, or 1.5 seconds.

Figures 5A, 5B:
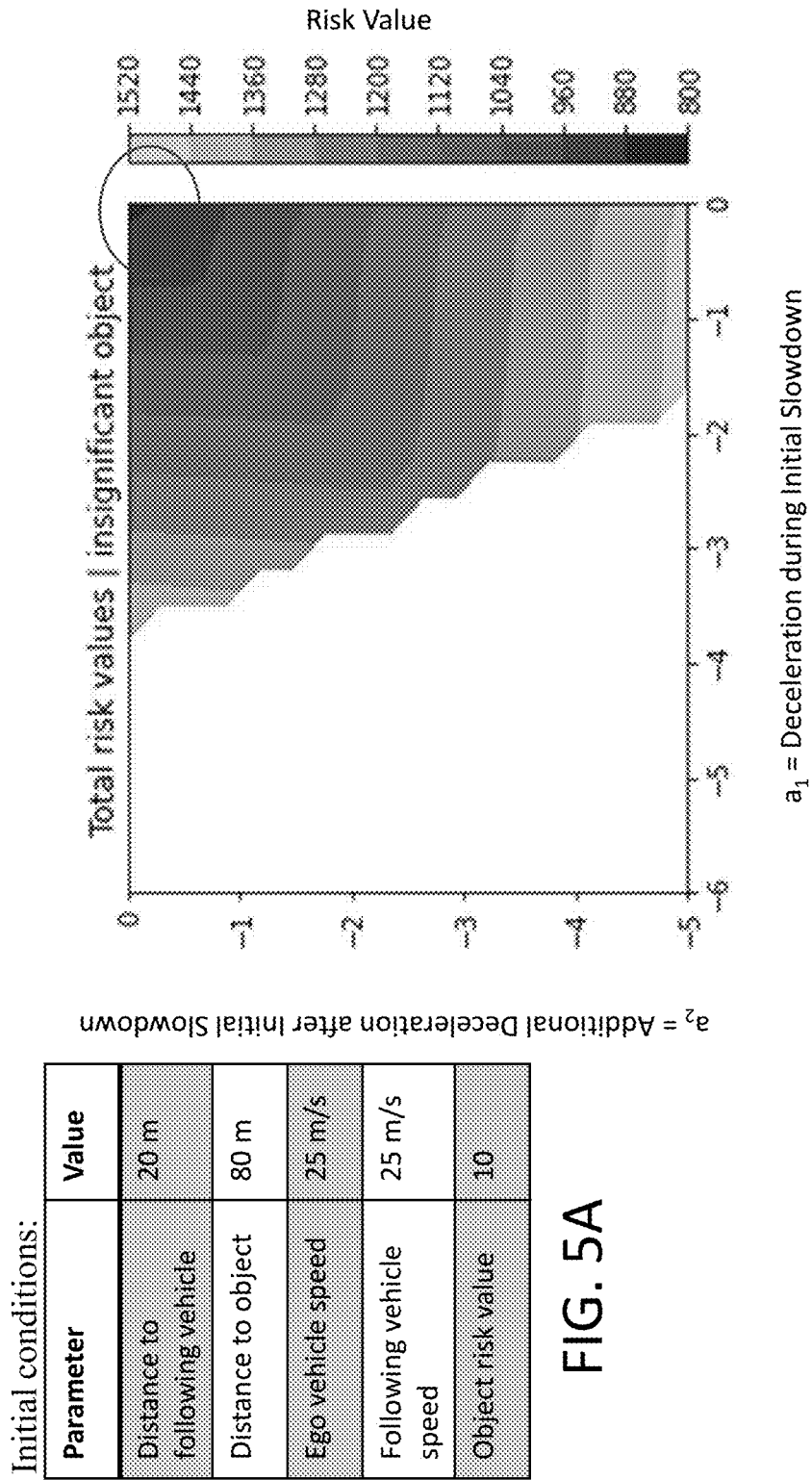
FIG. 5A depicts a table of an example of conditions used to calculate the vehicle deceleration plan.
FIG. 5B depicts a diagram of an example illustrating various risk calculations showing the optimal factors to select in determining the vehicle deceleration plan for an insignificant object.

FIG. 5A depicts a table of an example of conditions used to calculate a vehicle deceleration plan according to an exemplary simulation. The conditions may be determined by the data collected by the vehicle sensors. The vehicle sensors may be configured to determine that a distance between the vehicle 105 and the preceding vehicle 115 is 20 meters. The vehicle sensors may be configured to determine that the distance between the vehicle 105 and the object 115 is 80 meters. The vehicle sensors may be configured to determine that the speed of the vehicle 105 is 25 meters per second. Additionally, the vehicle sensors may be configured to determine that the speed of the preceding vehicle 115 is 25 meters per second. The vehicle sensors may be configured to determine that the speed of risk value of the object has a value of 10.

FIG. 5B depicts a diagram of an exemplary simulation illustrating various deceleration calculations for determining the optimal vehicle deceleration plan for an insignificant object. The diagram presents simulation results that map the solution space (i.e., different decelerations) to a corresponding risk value. The top right corner where $a_1=0$ and $a_2=0$ represents the risk posed to the vehicle if no deceleration occurs. The bottom left corner where $a_1=-6$ and $a_2=-5$ represents the risk posed to the vehicle if maximum deceleration occurs. The various shadings represent the optimal decelerations to select in response to the object 110. Darker shaded areas represent the most optimal decelerations for the vehicle 105 and the lighter shaded areas represent the less optimal decelerations for the vehicle 105. The areas with no shading represent deceleration calculations that are not viable or otherwise unacceptable. For example, the area with no shading may represent a collision with the preceding vehicle 115 if the corresponding deceleration calculations are selected. In another example, the area with no shading may represent scenarios in which the vehicle 105 would not even reach the object 115 if the corresponding deceleration calculations are selected. The figure generated by the simulation tool indicates the most optimal deceleration rates are where the lowest risk value is located.

The optimal decelerations may be selected to minimize the total risk value to the vehicle 105. In the example presented in FIG. 5, the vehicle 105 encounters an object posing a relatively low threat and the preceding vehicle has maintained a distance of 20 meters. In this case, the lowest risk value is located in the top right hand corner corresponding to no initial deceleration and subsequent deceleration. In other words, the vehicle requires no slowdown to prevent damage to the vehicle caused by the object 110. An unnecessary slowdown may cause a collision with the preceding vehicle 115 or the vehicle to stop before reaching the object 110. An unnecessary slowdown may cause annoyance to the vehicle occupants and the preceding vehicle 115 from an overreaction to the insignificant object. The various deceleration calculations may be based on the vehicle deceleration plan factors.

Figures 6A, 6B:
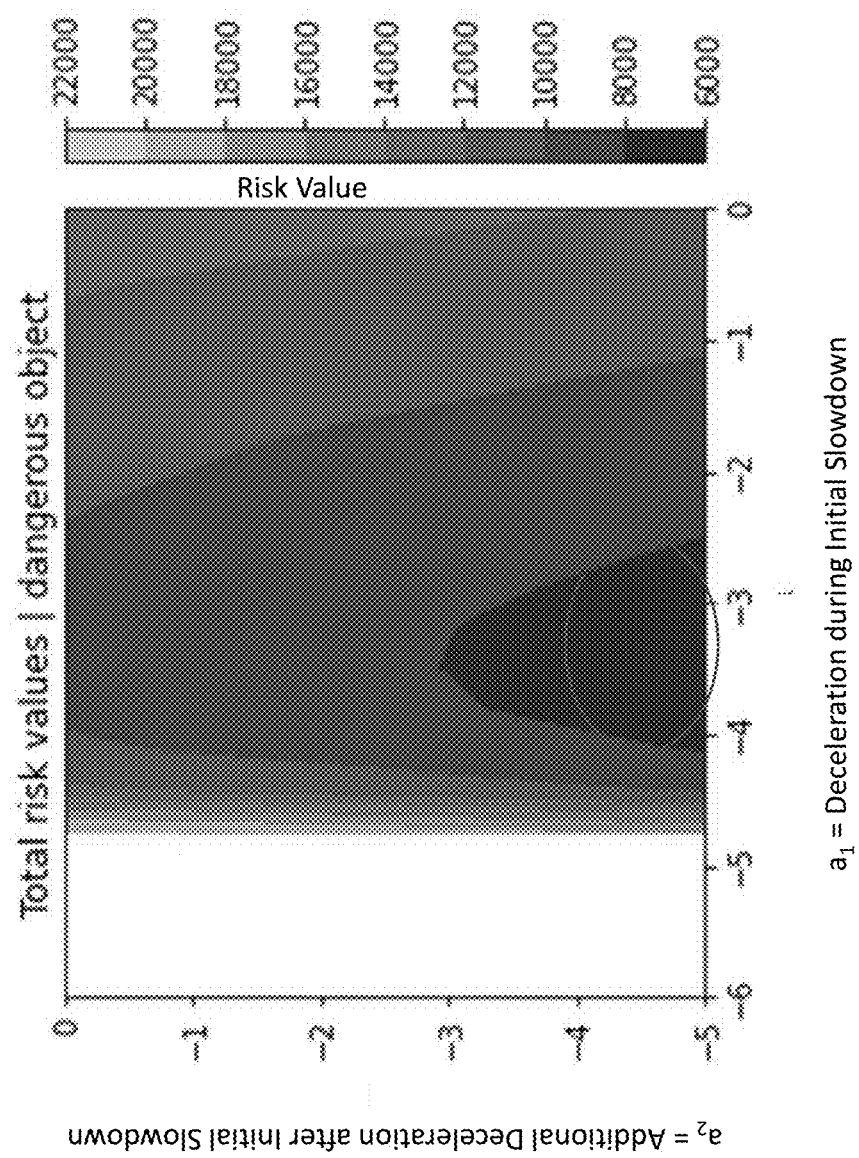
FIG. 6A depicts a table of an example of conditions used to calculate the vehicle deceleration plan.
FIG. 6B depicts a diagram of another example illustrating various risk calculations showing the optimal factors to select in determining the vehicle deceleration plan for a dangerous object.

FIG. 6A depicts a table of another example of conditions used to calculate a vehicle deceleration plan according to an exemplary simulation. The conditions may be determined by the data collected by the vehicle sensors. The vehicle sensors may be configured to determine that a distance between the vehicle 105 and the preceding vehicle 115 is 10 meters. The vehicle sensors may be configured to determine that the distance between the vehicle 105 and the object 115 is 90 meters. Additionally, the vehicle sensors may be configured to determine that the speed of the vehicle 105 is 35 meters per second. The vehicle sensors may be configured to determine that the speed of the preceding vehicle 115 is 35 meters per second. The vehicle sensors may be configured to determine that the speed of risk value of the object has a value of 100.

FIG. 6B depicts a diagram of another exemplary simulation illustrating various deceleration calculations for determining the optimal vehicle deceleration plan for a dangerous object. The diagram presents simulation results that map the solution space (i.e., different decelerations) to a corresponding risk value. The top right corner where $a_1=0$ and $a_2=0$ represents the risk posed to the vehicle if no deceleration occurs. The bottom left corner where $a_1=-6$ and $a_2=-5$ represents the risk posed to the vehicle 105 if maximum deceleration occurs. The various shadings represent the optimal decelerations to select in response to the object 110. Darker shaded areas represent the most optimal decelerations for the vehicle 105 and the lighter shaded areas represent the less optimal decelerations for the vehicle 105.

The areas with no shading represent deceleration calculations that are not viable or otherwise unacceptable. For example, the area with no shading may represent a collison with the preceding vehicle 115 if the corresponding deceleration calculations are selected. In another example, the area with no shading may represent scenarios in which the vehicle 105 would not even reach the object 110 if the corresponding deceleration calculations are selected. The figure generated by the simulation tool indicates the most optimal deceleration rates are where the lowest risk value is located. The areas with lighter shading represent a collision with the object 110 presenting minimal damage. The areas with heavier shading represent a collision with the object 110 with maximum damage.

The optimal decelerations may be selected to minimize the total risk value to the vehicle 105. In the example presented in FIG. 5, the vehicle 105 encounters an object 110 posing a relatively high threat and the preceding vehicle has maintained a distance of 10 meters. In this case, the lowest risk value is located along the bottom center corresponding to an initial deceleration of −3 meters per second squared and a subsequent deceleration of −6 meters per second squared. In other words, the vehicle requires a significant deceleration followed by an even more significant deceleration after a predetermined reaction time.

Otherwise, the vehicle risks damage to the vehicle caused by the object 110 or a rear end collision with the preceding vehicle 115. A more rapid initial deceleration would increase the risk of a rear-end collision with the preceding vehicle 115 and less rapid initial deceleration would increase the risk of a significant collision with the object 110 in the road. A maximum subsequent deceleration may be the most optimal deceleration regardless of the rate of the initial deceleration. More precisely, in the displayed exemplary embodiment, the optimal deceleration is a moderate slowdown (e.g., decelerate at 3.5 meters per second squared) followed by a more severe slowdown (e.g., decelerate at 8.5 meters per second squared). According to these results, the worst-case time-to-collision would be 0.4 seconds. The various deceleration calculations may be based on the vehicle deceleration plan factors.

Figure 7:
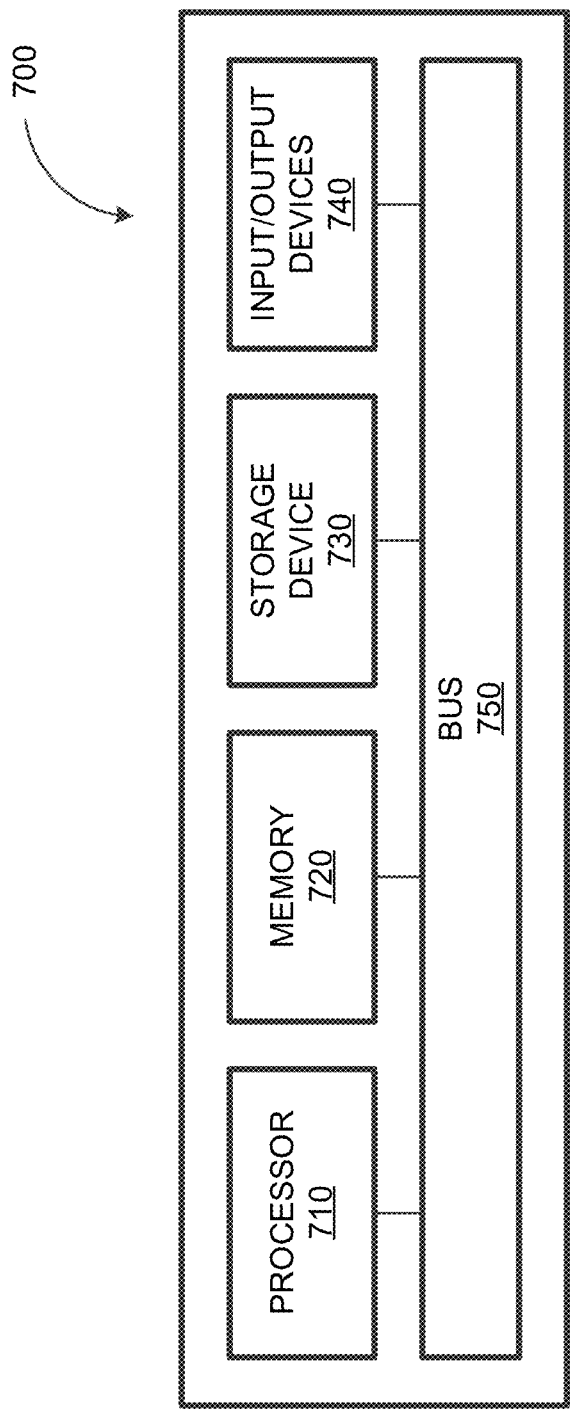
FIG. 7 depicts a block diagram illustrating a computing system consistent with implementations of the current subject matter.

FIG. 7 depicts a block diagram illustrating a computing system 700 consistent with implementations of the current subject matter. Referring to FIGS. 1-7, the computing system 700 may be used to generate a vehicle deceleration plan. For example, the computing system 700 may implement a user equipment, a personal computer, or a mobile device.

As shown in FIG. 7, the computing system 700 may include a processor 710, a memory 720, a storage device 730, and an input/output device 740. The processor 710, the memory 720, the storage device 730, and the input/output device 740 may be interconnected via a system bus 750. The processor 710 is capable of processing instructions for execution within the computing system 700. Such executed instructions may implement one or more components of, for example, cross-cloud code detection. In some example embodiments, the processor 710 may be a single-threaded processor. Alternately, the processor 710 may be a multi-threaded processor. The processor 710 is capable of processing instructions stored in the memory 720 and/or on the storage device 730 to display graphical information for a user interface provided via the input/output device 740.

The memory 720 is a non-transitory computer-readable medium that stores information within the computing system 700. The memory 720 may store data structures representing configuration object databases, for example. The storage device 730 is capable of providing persistent storage for the computing system 700. The storage device 730 may be a floppy disk device, a hard disk device, an optical disk device, or a tape device, or other suitable persistent storage means. The input/output device 740 provides input/output operations for the computing system 700. In some example embodiments, the input/output device 740 includes a keyboard and/or pointing device. In various implementations, the input/output device 740 includes a display unit for displaying graphical user interfaces.

According to some example embodiments, the input/output device 740 may provide input/output operations for a network device. For example, the input/output device 740 may include Ethernet ports or other networking ports to communicate with one or more wired and/or wireless networks (e.g., a local area network (LAN), a wide area network (WAN), the Internet, a public land mobile network (PLMN), and/or the like).

In some example embodiments, the computing system 700 may be used to execute various interactive computer software applications that may be used for organization, analysis and/or storage of data in various formats. Alternatively, the computing system 700 may be used to execute any type of software applications. These applications may be used to perform various functionalities, e.g., planning functionalities (e.g., generating, managing, editing of spreadsheet documents, word processing documents, and/or any other objects, etc.), computing functionalities, communications functionalities, etc. The applications my include various add-in functionalities or can be standalone computing items and/or functionalities. Upon activation within the applications, the functionalities may be used to generate the user interface provided via the input/output device 740. The user interface may be generated and presented to a user by the computing system 700 (e.g., on a computer screen monitor, etc.).

This disclosure addresses the scenario of an object suddenly appearing in front of the AV. This is an important scenario to address because it is expected that the AV would at some point have to negotiate this scenario. The disclosure provides an algorithm that is implemented in software and therefore does not increase parts cost. The present disclosure also enhances AV performance by allowing it to handle some special cases.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A system comprising:
a processor;
a non-transitory computer-readable storage medium storing instructions that, when executed by the processor, cause the processor to perform operations comprising:
determining a vehicle trajectory in which a subject vehicle passes over an object detected in front of the subject vehicle;
in response to determining the vehicle trajectory, generating a vehicle deceleration plan for approaching the object and traveling over the object; and
executing the vehicle deceleration plan in the subject vehicle as the subject vehicle travels over the object, wherein the vehicle deceleration plan is based on a preceding vehicle located within a predetermined distance behind the subject vehicle, and wherein the vehicle deceleration plan is based on a preceding vehicle reaction time representative of time necessary for the preceding vehicle to react to the subject vehicle decelerating.

2. The system of claim 1, wherein the object is detected based on data received from a vehicle sensor, and wherein the vehicle deceleration plan is based on a distance between the subject vehicle and the object.

3. The system of claim 1, wherein the determining the vehicle trajectory is based on determining that traveling over the object is a least dangerous trajectory for the subject vehicle.

4. The system of claim 1, wherein the vehicle deceleration plan includes a first rate of deceleration of the subject vehicle and a second rate of deceleration of the subject vehicle, the second rate of deceleration decelerating at a higher rate than the first rate of deceleration.

5. The system of claim 4, wherein the second rate of deceleration is subsequent in time to the first rate of deceleration.

6. The system of claim 1, wherein the vehicle deceleration plan balances a rear-end collision risk of the preceding vehicle with the subject vehicle and a risk of traveling over the object at a speed greater than a predetermined speed.

7. The system of claim 1, wherein the vehicle deceleration plan is based on a predicting a minimum time necessary for a rear-end collision of the preceding vehicle with the subject vehicle, wherein the minimum time necessary for the rear-end collision is based on a preceding vehicle distance, a preceding vehicle speed, and a preceding vehicle deceleration.

8. The system of claim 1, wherein the operations further comprise:
in response to determining the vehicle trajectory is to pass over the object, determining an object width is less than an inner distance from a left tire to a right tire of the subject vehicle;
in response to determining the vehicle trajectory is to pass over the object, determining an object height is less than a vehicle ground clearance; and
in response to determining that the object width is less than the inner distance and in response to determining the object height is less than the vehicle ground clearance, adjusting the vehicle deceleration plan for approaching the object and traveling over the object.

9. The system of claim 1, wherein the operations further comprise:
adjusting the vehicle deceleration plan;
in response to adjusting the vehicle deceleration plan, determining whether the object remains in front of the vehicle; and
in response to determining the object remains in front of the vehicle, further adjusting the vehicle deceleration plan for approaching the object and traveling over the object.

10. The system of claim 1, wherein the vehicle deceleration plan is based on a risk of damage to the subject vehicle by driving over the object at a predetermined speed.

11. The system of claim 10, wherein the risk of damage is determined by calculating a danger that the object poses to the subject vehicle and the predetermined speed is calculated based on a vehicle speed, a vehicle deceleration, and a preceding vehicle reaction time representative of time necessary for the preceding vehicle to react to the vehicle decelerating.

12. The system of claim 1, wherein the vehicle deceleration plan is based on a maximum deceleration of the subject vehicle and a jerk indicative of a rate of change of deceleration.

13. A non-transitory computer-readable storage medium storing instructions that, when executed by a processor, cause the processor to perform operations comprising:
- determining a vehicle trajectory is to pass over an object in front of a subject vehicle;
- in response to determining that the vehicle trajectory is to pass over the object, adjusting a vehicle deceleration plan for approaching the object and traveling over the object; and
- executing the vehicle deceleration plan in the subject vehicle as the subject vehicle travels over the object,
- wherein the vehicle deceleration plan is based on a preceding vehicle located within a predetermined distance behind the subject vehicle, and wherein the vehicle deceleration plan is based on a preceding vehicle reaction time representative of time necessary for the preceding vehicle to react to the subject vehicle decelerating.

14. The non-transitory computer-readable storage medium of claim 13, wherein the object is detected based on data received from a vehicle sensor, and wherein the vehicle deceleration plan is based on a distance between the subject vehicle and the object.

15. The non-transitory computer-readable storage medium of claim 13, wherein the determining the vehicle trajectory is to pass over the object in front of the subject vehicle is based on determining that passing over the object is the least dangerous trajectory for the subject vehicle.

16. The non-transitory computer-readable storage medium of claim 13, wherein the vehicle deceleration plan includes a first rate of deceleration of the subject vehicle and a second rate of deceleration of the subject vehicle, the second rate of deceleration decelerating at a higher rate than the first rate of deceleration.

17. The non-transitory computer-readable storage medium of claim 16, wherein the second rate of deceleration follows the first rate of deceleration.

\* \* \* \* \*